US011292177B2

(12) United States Patent
Zimmermann et al.

(10) Patent No.: US 11,292,177 B2
(45) Date of Patent: Apr. 5, 2022

(54) COOLING DEVICE WITH A COOLING GAS RING AND A FLOW GUIDING DEVICE

(71) Applicant: Kdesign GmbH, Konigswinter (DE)

(72) Inventors: Richard Zimmermann, Siegburg (DE); Gerd Fahling, Eitorf (DE)

(73) Assignee: Kdesign GmbH, Konigswinter (DE)

( * ) Notice: Subject to any disclaimer, the term of this patent is extended or adjusted under 35 U.S.C. 154(b) by 368 days.

(21) Appl. No.: 16/419,394

(22) Filed: May 22, 2019

(65) Prior Publication Data
US 2019/0358884 A1 Nov. 28, 2019

(30) Foreign Application Priority Data

May 22, 2018 (EP) ..................... 18173543

(51) Int. Cl.
*B29C 48/88* (2019.01)
*F28F 13/06* (2006.01)
*B29C 48/10* (2019.01)
*B29C 48/00* (2019.01)

(52) U.S. Cl.
CPC ............ *B29C 48/913* (2019.02); *F28F 13/06* (2013.01); *B29C 48/0018* (2019.02); *B29C 48/10* (2019.02); *F28F 2250/102* (2013.01)

(58) Field of Classification Search
CPC ..... B29C 48/10; B29C 48/0018; B29C 48/88; B29C 48/885; B29C 48/903; B29C 48/913; B29C 51/427; B29L 2023/001; F15D 1/025
USPC ....................................................... 425/72.1
See application file for complete search history.

(56) References Cited

U.S. PATENT DOCUMENTS

| 4,784,590 | A | * | 11/1988 | Halter | ..................... B29C 48/10 425/72.1 |
| 5,310,329 | A | * | 5/1994 | Cree | ..................... B29C 48/913 425/72.1 |
| 5,580,582 | A | * | 12/1996 | Achelpohl | .............. B29C 48/92 425/72.1 |
| 2018/0361647 | A1 | * | 12/2018 | Nakano | ................... B29C 48/92 |

FOREIGN PATENT DOCUMENTS

DE 102006040184 3/2008
EP 1736297 12/2006

* cited by examiner

*Primary Examiner* — Francisco W Tschen
*Assistant Examiner* — Edgaredmanuel Troche
(74) *Attorney, Agent, or Firm* — Burris Law, PLLC (57) ABSTRACT

A cooling device for external cooling of a film tube subjected to internal pressure in the production of blown films of thermoplastic material includes a cooling gas ring with a ring housing and a ring nozzle arranged concentrically to a central axis and being open towards the film tube. At least one inner ring channel extending in the circumferential direction about the central axis and being open radially inwards towards the ring nozzle is included. At least one feed channel for supplying cooling gas is attached to the ring housing and connected to the ring channel. The cooling device also includes at least one flow guiding device arranged in the at least one feed channel. When a cooling gas flows through the flow guiding device, at least a partial flow of the cooling gas is set in rotation about a flow axis prior to flowing into the ring channel.

20 Claims, 5 Drawing Sheets

COOLING DEVICE WITH A COOLING GAS RING AND A FLOW GUIDING DEVICE

CROSS-REFERENCE TO RELATED APPLICATIONS

This application claims priority to and the benefit of EP 18173543.2, filed on May 22, 2018. The disclosure of this application is incorporated herein by reference.

FIELD

The present disclosure relates to a cooling device for the external cooling of a film tube subjected to internal pressure in the production of blown films made of thermoplastic material.

BACKGROUND

The statements in this section merely provide background information related to the present disclosure and may not constitute prior art.

Cooling devices with cooling gas rings having one or more tangential feed connectors are known in which the tangential supply of cooling gas into a ring channel is intended to ensure a uniform distribution of the cooling gas before the cooling gas exits cooling lips and cools a sensitive film tube. A uniform distribution of the cooling gas over the circumference is extremely important, since the blowing takes place in the tube formation zone between the area where the melt exits an extrusion die and the freezing point. Due to the complex stretching process of the cooling melt in this tube forming zone, any unevenness of the cooling gas flow leads to a disturbance of the thickness profile of the tubular film in the circumferential direction.

From DE 10 2006 040 184 A1 a cooling gas ring for the external cooling of a film tube under pressure with a horn-shaped bent ring housing is known. Only a single air feed connector is connected to the ring housing, through which cooling gas can flow into a ring channel formed in the ring housing. In order to distribute the cooling gas as evenly as possible in the ring channel, the ring channel has a flow cross-section that tapers in the direction of flow. Radially inwards, the ring channel is open towards a ring nozzle arranged concentrically to a central axis, whereby a flow straightener arrangement is arranged between the ring channel and the ring nozzle.

When designing the cooling gas ring with only one single air feed connector, a residual quantity of the cooling gas flowing in must always flow through the ring channel by more than 360° in the circumferential direction around the central axis, so that the cooling gas can emerge from the ring nozzle approximately evenly distributed along the entire ring nozzle. For this purpose, the ring housing may comprise a housing tongue between the air feed connector and the ring nozzle so that a passage gap is formed between the housing tongue and the ring nozzle to allow complete circulation of the residual flow in the circumferential direction. However, the merge of the residual flow of cooling gas with the fresh cooling gas flowing through the air feed connector can lead to a locally limited but uneven outlet of the cooling gas from the ring nozzle. These flow disturbances in the cooling gas ring lead to an uneven foil thickness over the circumference.

A typical measure to reduce such a flow disturbance is the downstream connection of built-in components, which generate a higher back pressure or pressure loss. This, however, reduces the air flow rate of the cooling gas ring, which is why ventilators with significantly higher pressure levels are often used to compensate the reduced air flow rate compensation. As a result, this leads to increased energy consumption and an undesirable increase of the temperature of the cooling gas.

Furthermore, cooling gas rings with several air feed connectors are known, which are equally distributed in the circumferential direction on the ring housing. Such a cooling gas ring is known from EP 1 736 297 A1, for example. This ensures a more uniform distribution of the cooling gas in the ring channel, so that the cooling gas can exit from the ring nozzle over the circumference with equal distribution. However, depending on the preset air flow rate, the merge of the cooling gas flowing within the ring channel and passing one of the air feed connectors with the cooling gas flowing through the respective air feed connector can lead to flow disturbances, which in turn can disturb the thickness profile of the blown film in the circumferential direction. Another disadvantage is the large number of hoses connecting the cooling gas ring with a ventilator.

SUMMARY

An improved cooling device in which cooling gas exits a ring nozzle uniformly and which pressure loss is reduced is provided.

In one form of the present disclosure, a cooling device includes a cooling gas ring for the external cooling of a film tube subjected to internal pressure in the production of blown films made of thermoplastic material of the type mentioned above. In some aspects of the present disclosure, the cooling device includes at least one flow guiding device which is arranged and constructed such that at least a partial flow of a cooling gas flowing through the at least one feed channel into the ring channel is set in rotation about a flow axis.

In such aspects, the cooling gas enters the at least one feed channel via an inlet opening on the fan side and exits the at least one feed channel via a feed opening on the cooling ring side. The at least one feed channel is limited by a lateral channel wall. The respective channel wall of the at least one feed channel defines a fluid space extending along a longitudinal axis of the at least one feed channel. The cooling gas flows through the fluid space defined by the at least one feed channel. Consequently, along the at least one feed channel, the longitudinal axis of the at least one feed channel defines the respective flow axis of the cooling gas. The at least one feed channel can have rigid parts, such as a feed nozzle attached to the ring housing, and/or flexible parts, such as a hose. Therefore, the respective longitudinal axis of at least one feed channel can be a straight line or a curved line or can have straight and curved sections.

When the cooling gas flows through the flow guiding device, the cooling gas is forced to rotate (rotary flow) in the at least one feed channel. The cooling gas flowing downstream thus rotates around its flow axis before it flows into the ring channel, whereby the mixing of the cooling gas flowing downstream and the cooling gas already flowing in the ring channel is optimized. As a result, a uniform flow profile is created in the ring channel so that the cooling gas can exit the ring nozzle evenly distributed along the entire circumference.

During operation of the cooling device, the cooling gas flows through at least one feed channel into the ring channel. At least one feed channel means that only a single feed channel, as shown in DE 10 2006 040 184 A1, or several feed channels, as shown in EP 1 736 297 A1, both of which are incorporated herein by reference, can be attached to the ring channel. The basic principle is that each feed channel is assigned its own flow guiding device so that the cooling gas flowing into the ring channel via the respective feed channel is rotated around the respective flow axis before entering the ring channel.

The at least one flow guiding device for generating the rotation around the flow axis may be arranged in a peripheral area of the at least one feed channel. In this way, the partial flow of the cooling gas flowing along the channel wall of the at least one feed channel, i.e. along the peripheral area of the feed channel, can be set in rotation about the flow axis, whereas a partial flow of the cooling gas, which flows through a central region of the at least one feed channel enclosed by the peripheral area, is not set in rotation by the at least one flow guiding device. For this purpose, the at least one flow guiding device may have a central outlet through which the partial flow of the cooling gas can flow unhindered. In principle, it is also possible that the at least one flow guiding device extends over the entire flow cross-section of the respective feed channel, so that the entire cooling gas flow in the respective feed channel is rotated about the flow axis.

In some aspects of the present disclosure, the at least one flow guiding device is built as an independent component. Hence, said at least one flow guiding device can be handled as a single part. This means that the at least one flow guiding device can be easily inserted into the at least one feed channel or removed again. Thus, the at least one flow guiding device can be retrofitted in a conventional cooling device and removed for cleaning purposes. Thus, the at least one flow guiding device can also be used in conventional cooling devices.

The at least one flow guiding device may comprise several guide elements in order to force the rotary flow in the at least one feed channel. The guide elements may be fixed or held stationary in the at least one feed channel. Then, the guide elements do not rotate around the flow axis and cannot move along the flow axis. The at least one flow guiding device can have adjustable guide elements in order to change the gas flow of the cooling gas flowing through the at least one feed channel. For example, the setting angle of the guide elements with regard to the gas flow or the alignment of the guide elements with regard to the fixed guide elements or the penetration depth of the guide elements into the respective feed channel can be adjusted. In the event that the at least one flow guiding device comprises both fixed and adjustable guiding elements, the adjustable guide elements can be connected upstream and/or downstream of the fixed guide elements in the direction of flow. Furthermore, at least a subset of the guide elements can be distributed in the circumferential direction around the flow axis. In addition, or alternatively, a subset of the guide elements can be arranged one behind the other in the direction of flow.

For example, at least a subset of the guide elements can be made of sheet metal. At least a subset of the guide elements is plate-shaped or curved. In this way, an easy to manufacture and efficient flow guiding device is provided. Furthermore, the guide elements can include blades with a flow profile, in particular an arcuate profile. A section of the guide elements exposed to the flow can be continuously closed, slotted or perforated. All guide elements of the at least one flow guiding device can be configured identical.

At least a subset of the guide elements can be arranged with a setting of about 30° to 60° to the flow axis. Then, the cooling gas flowing through at least one feed channel is well mixed with the flow of cooling gas already flowing within the ring channel passing the respective feed channel, whereby good results are achieved for the homogenizing of the flow in the ring channel. The respective setting angle may be understood as the angle between the flow axis and an imaginary straight line connecting a leading edge facing the flow with a trailing edge of the respective guide element facing away from the flow. The imaginary straight line can also be called a chord.

The at least one flow guiding device may comprise at least one tubular basic body. At least a subset of the guide elements can be held on the at least one basic body. The at least one basic body can be pushed into the at least one feed channel or can be a part of the feed channel and as such may be attached, for example, to a feed connector of the cooling ring or to a hose.

According to a first example, the cooling device comprises exclusively one feed channel. For the introduction of cooling gas into the ring channel, the ring housing comprises exclusively one feed opening to which the feed channel is connected with a feed connector attached to the ring housing. This means that the ring channel is only supplied with cooling gas said merely one feed channel. In combination with the flow guiding device, good results are achieved for the homogenizing of the cooling gas ring. This is because the flow irregularities occurring in conventional cooling rings with only one feed channel at the point where the circulating flow of cooling-gas already flowing within the ring channel and the cooling as flowing downstream via the feed channel do not occur due to the cooling gas rotating around its flow axis forced by the flow guiding device and flowing downstream. For example, together with a tangential disposed feed connector, a cooling device can be provided, which ensures enhanced air distribution even at very low back pressure, irrespective of a preset operating point, which results from the air volume and back pressure of the ring nozzle and the cooling lips, which are typically connected to the ring nozzle.

Furthermore, the flow cross-section of the ring channel of the cooling gas ring having exclusively one single feed channel can decrease circumferentially around a center axis over a length of the ring channel. The flow cross-section can decrease continuously or in steps. The flow cross-section is maximum, especially at the feed opening of the feed channel into the ring channel, with the flow cross-section decreasing in the direction of flow. The ring housing, following the ring channel, can be shaped like a horn with a recess that is arranged concentric to the central axis.

According to a second example, which can be regarded as an alternative to the aforementioned first example in which the cooling device has exclusively one feed channel, the ring housing can comprise several feed openings for the introduction of cooling gas into the ring channel. To each of said feed openings one of the feed channels may be connected with a feed connector attached to the ring housing. The feed nozzles may be arranged in the same direction with regard to the circumferential direction around the central axis as they enter the ring cage. In this way, the cooling gas can flow into the ring channel evenly distributed over the circumference. The cooling gas ring can have two or more, for example up to 20 feed channels. When designing the cooling gas ring with several feed channels, it should be understood that each of the feed channels is assigned its own flow guiding device.

For both, the aforementioned first example and the second example, the at least one feed connector can be attached approximately tangentially from the outside to the ring housing. This leads to the affect that the cooling gas flowing through the at least one feed connector into the ring channel is transferred into a swirl flow. A swirl flow is a flow that rotates around the center axis. It has to be noted that said swirl flow is not the rotatory flow, which is generated by the at least one flow guiding device. The rotary flow is a flow in which the cooling gas flowing through the respective feed channel rotates around the flow axis. The flow axis and the center axis do not have a common intersection point.

Furthermore, the at least one flow guiding device can be arranged in or on the at least one feed connector. By the arrangement of the at least one flow guiding device in direct proximity to the respective feed opening of the ring channel, good results were achieved when mixing the cooling gas entering the ring channel with the cooling gas already flowing within the ring channel. Furthermore, the at least one feed channel may have at least one hose in which the at least one flow guiding device can be inserted. Likewise, the at least one flow guiding device may be arranged between two hoses. Furthermore, the at least one flow guiding device can be arranged between the ring housing, for example the at least one feed connector, and the associated hose. The at least one flow guiding device can, for example, be attached to the respective adjacent part of the feed channel, in particular the hose and/or the feed connector, for example, by means of conventional pipe clamps.

The cooling gas flowing into the ring channel during operation of the cooling ring is set into a swirling flow due to the at least approximately tangentially attachment of the at least one feed channel on the outside of the ring housing. The swirl, which is undesirable when the blown film is inflated with cooling gas, can be reduced by a flow straightener arrangement downstream of the ring channel. In this respect, the flow straightener arrangement can be arranged between the ring channel and the ring nozzle, which may be formed by several radially aligned and circumferentially distributed flow channels. At the outlet of the flow channels, the cooling gas flows out in a radial direction.

The flow channels can, for example, have narrow, radially directed channels whose length is a multiple of their width. The flow channels can also be formed by bores, for instance round bores, or honeycombed channels. The flow channels can have a rectangular or square cross-section or a round cross-section. The flow cross-section of the individual flow channels can be constant or can change in a radial direction. Furthermore, the flow cross-section can be adjustable. Such adjustability is shown, for example, in EP 1 736 297 A1 which is incorporated herein by reference.

Where the term feed channel is used, this refers to a duct conducting the cooling gas which may be located between a pressure source, such as a ventilator, which can also be referred to as a fan, and the feed opening of the ring channel. The at least one feed channel may have rigid parts, such as a feed connector attached to the ring housing, and/or flexible parts, such as a hose. The at least one feed channel can have at least one tubular and/or hose-shaped part. For example, the cross-section of the at least one feed channel can be constant or variable along its length. For example, the cross-section of at least one feed channel may be at least in sections rectangular, square, round or oval.

If the term ring nozzle is used, this does not necessarily mean the direct cooling gas outlet from the ring housing. Rather, the ring nozzle can be equipped with one or more cooling lips, which can be screwed to the ring nozzle in an exchangeable manner. This allows easy adaptation to different film tube diameters without having to replace the cooling gas ring with another cooling gas ring.

In another from of the present disclosure, a cooling device for the external cooling of a film tube subjected to internal pressure in the production of blown films of thermoplastic material includes a cooling gas ring comprising a ring housing with a ring nozzle arranged concentrically to a central axis and being open towards the film tube. At least one inner ring channel extends in the circumferential direction about the central axis and opens radially inwards towards the ring nozzle. The at least one feed channel for supplying cooling gas is attached to the ring housing and connected to the ring channel. The cooling device also includes at least one flow guiding device which is arranged in the at least one feed channel. The at least one flow guiding device comprises at least one of fixed guide elements and adjustable guide elements such that when a cooling gas flows through the flow guiding device, at least a partial flow of the cooling gas is set in rotation about a flow axis prior to flowing into the ring channel.

In still another from of the present disclosure, a cooling device for the external cooling of a film tube subjected to internal pressure in the production of blown films of thermoplastic material includes a cooling gas ring comprising a ring housing with a ring nozzle arranged concentrically to a central axis and being open towards the film tube. At least one inner ring channel extending in the circumferential direction about the central axis and being open radially inwards towards the ring nozzle is included and at least one feed channel for supplying cooling gas is attached to the ring housing and connected to the ring channel. The cooling device also includes at least one flow guiding device which is arranged in the at least one feed channel. The at least one flow guiding device is formed in a peripheral area of the at least one feed channel and comprises fixed guide elements that define a central opening and at least a partial flow of the cooling gas flowing through the flow guiding device rotates about a flow axis prior to flowing into the ring channel.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
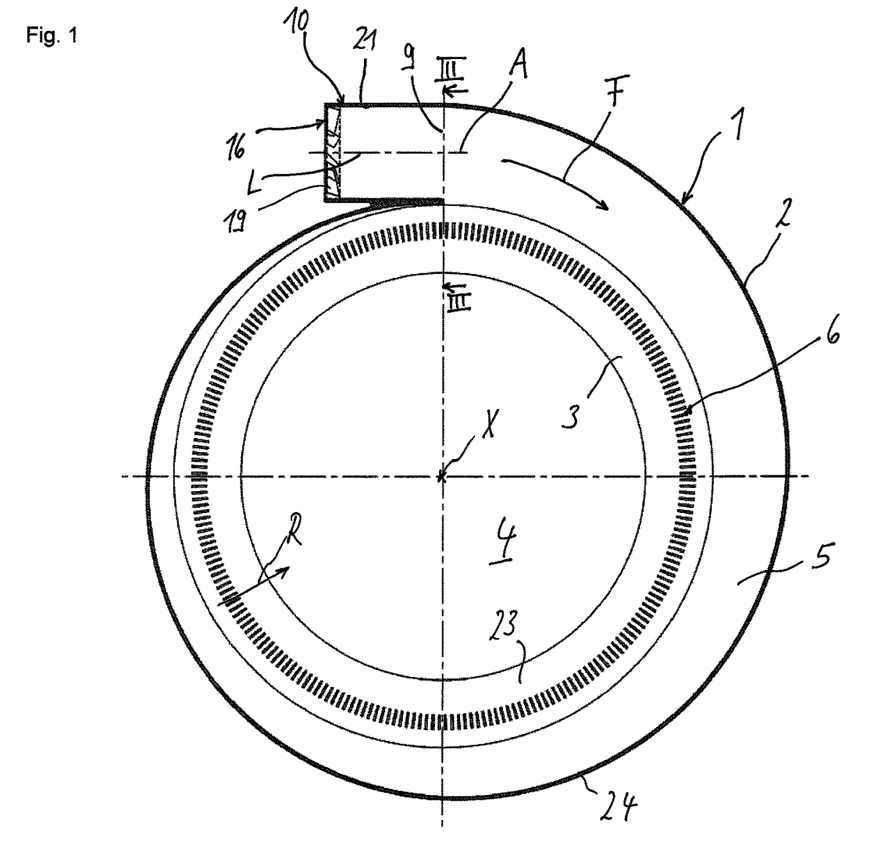
FIG. 1 shows a cooling device in a longitudinal sectional view.
Figure 2:
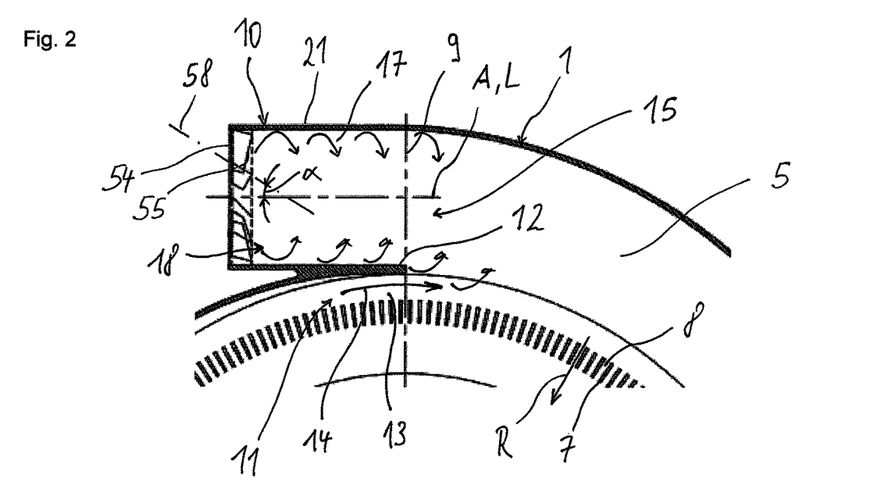
FIG. 2 is an enlarged detail from FIG. 1.
Figure 3:
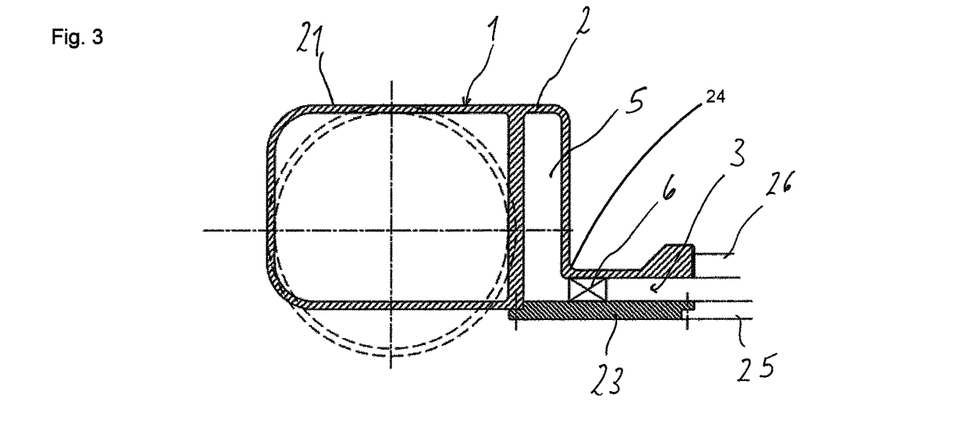
FIG. 3 is a partial view of the cooling device from FIG. 1 in radial section along the section line III-III shown in FIG. 1.

FIGS. 1 to 3 show a cooling device according to a first example. The cooling device is used for external cooling of an internally pressurized film tube in the production of blown films made of thermoplastic material.

The cooling device comprises a cooling gas ring 1 with a ring housing 2, which comprises a ring nozzle 3 arranged concentrically to a central axis X. The ring nozzle 3 encloses a central recess 4 of the ring housing 2, through which an internally pressurized film tube (not shown) is guided during the production of blown films. Inside the ring housing 2, a ring channel 5 is formed, which extends in the circumferential direction around the central axis X and merges radially inside into the ring nozzle 3, which is open radially inwards. A flow straightener device 6 may be arranged between the ring channel 5 and the ring nozzle 3, which, as shown here, is formed from a plurality of radially extending web walls 7, between each of which there are individual flow channels 8.

The ring channel 5 comprises a single feed opening 9 for supplying the cooling gas ring 1 with cooling gas. A feed channel 10 is connected to the feed opening 9, which, in this case, comprises a feed connector 21 formed on the ring housing 2. The feed connector 21 is attached to the ring housing 2 from the outside, at least approximately tangentially. The feed connector 21 comprises, in this case, a basic cylindrical shape on the feed side which extends along a longitudinal axis L. Along the longitudinal axis L, the initially round cross-section of the feed connector 21 passes into a rectangular cross-section with rounded corners (FIG. 3) in the feed opening 9. FIG. 3 shows the circular cross-section of the feed connector 21 with dotted lines on the feed side. The section shown in FIG. 3 runs through the feed opening 9. Basically, the feed connector 21 could also be tapered on the feed side, e.g., a tapered reducing piece could be pushed onto the feed connector 21 in order to be able to connect a cooling gas hose 37 (FIG. 6) to the feed channel 10. The feed connector 21 could also have a curved basic shape instead of the straight design, as shown here.

The feed channel 10 leads into the ring channel 5 via the feed opening 9. FIGS. 1 and 2 show that the flow cross-section of the ring channel 5 decreases continuously in the circumferential direction around the central axis X. The flow cross-section at the feed opening 9 is maximum and decreases in the flow direction shown by the arrow F in FIG. 1. In this way, the ring channel 5 tapers to an end region 11 of the ring channel 5. In the flow direction F at the end of the end region 11 of the ring channel 5, a clearance gap 13 is formed between a housing tongue 12 of the ring housing 2 and the ring nozzle 3 and the flow straightener device 6, respectively. In this way, the ring channel 5 is closed in a ring around the central axis X in the circumferential direction. During operation of the cooling gas ring 1, a majority of the cooling gas blown in through the feed channel 10 flows over the circumference out radially inwards to the ring nozzle 3. However, a residual flow 14 of cooling gas passes through the clearance gap 13 into an initial area 15 of the ring channel 5 again. The shape of the ring housing 2 follows the ring channel 5, which tapers continuously in flow direction F, and accordingly, the ring housing 2 comprises a curved shape like a horn, as can be seen in FIG. 1.

In order to mix the feed flow 17 (FIG. 2) of cooling gas flowing through the feed channel 10 into the ring channel 5 with the residual flow 14 of cooling gas, which passes the initial area 15 through the clearance gap 13 again, a flow guiding device 16 (FIG. 1) is arranged and configured such that a partial flow of the feed flow 17 of cooling gas, flowing through the peripheral area 18 of the feed connector 21, is forced to rotate about a flow axis A, which here corresponds at least in sections to the longitudinal axis L of the feed connector 21.

Figure 4:
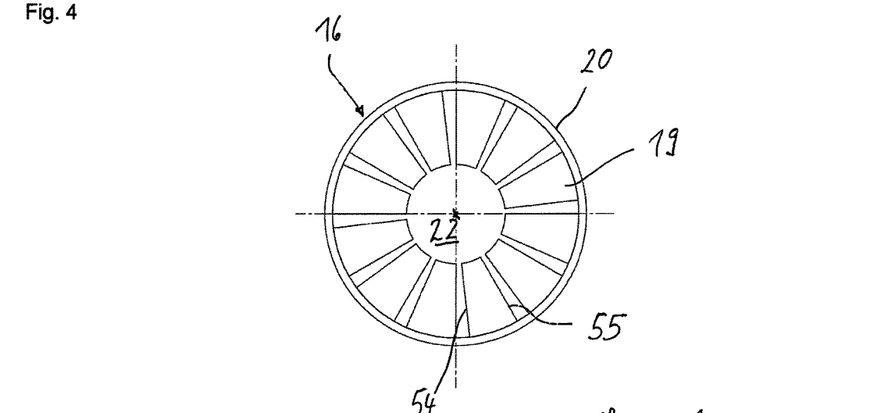
FIG. 4 is a side view of a flow guiding device from FIG. 1.

In some aspects of the present disclosure, the flow guiding device 16 is a separate unit, as shown in FIG. 4. The flow guiding device 16 comprises several guide elements 19 arranged equally distributed in the circumferential direction around the longitudinal axis L. The guide elements 19 are arranged in the direction of the circumference around the longitudinal axis L. The guide elements 19 are held radial with their outer end on a ring body 20. Furthermore, the guide elements 19 are plate-shaped. Each of the guide elements 19 comprise a leading edge 54 which faces the feed flow 17 and a trailing edge 55 which faces away from the feed flow 17 as shown in FIG. 2. An imaginary line 58 (FIG. 2), which connects the leading edge 54 with the trailing edge 55 of the respective guide element 19, encloses an angle α of about 30 degrees to 60 degrees with the flow axis A. The angle α can also be referred to as the setting angle. Furthermore, the radial inner ends of the guide elements 19 define a central passage opening 22.

As shown in FIGS. 1 and 2, the flow guiding device 16 is inserted into the feed connector 21 through the open end. Thus, the guide elements 19 are fixed in the feed connector 21. The flow guide elements 19 attached on the ring body 20 create a turbulence of the incoming cooling gas only within the peripheral area 18 within the feed connector 21, whereas the cooling gas can flow through the passage opening 22 of the flow guiding device 16 unhindered. In some aspects of the present disclosure, the guide elements 19 are attached directly to the channel wall of the feed connector 21, so that the ring body 20 is omitted.

As shown in FIG. 3, the cooling gas ring 1 is composed of a ring plate 23, which can also be referred to as base plate, and a ring trough 24. The feed connector 21 can, as shown here, be integrally formed on the ring trough 24. The flow straightener device 6 can also be attached to the ring trough 24. The ring nozzle 3 is formed, here, by the ring plate 23 and, only schematically indicated in FIG. 3 is further formed, by ring parts 25 held interchangeably on the ring plate 23 and by a cooling lip holder 26 held interchangeably on the ring trough 24 for further ring parts of the cooling lips.

During operation, the cooling gas flowing into the feed connector 21 is forced through the flow guiding device 16. The guide elements 19, which are arranged with the setting angle α to the flow axis A, force the cooling gas into a rotary flow so that a cylindrical feed flow 17 is generated in the feed channel 10 along the peripheral area 18. The cylindrical feed flow 17, which rotates around the flow axis A, extends through the feed opening 9 into the initial region 15 of the ring channel 5. There, the rotating feed flow 17 mixes with the residual flow 14 of cooling gas flowing through the passage gap 13. The cooling gas, which is evenly distributed over the circumference in ring channel 5, exits the ring nozzle 3 uniformly radially inwards through the flow channels 8 of the flow straightener device 6 such that the cooling gas is deflected into a radial direction. For the sake of simplicity, the radial flow evenly distributed over the circumference is shown only at one point with the arrow R (e.g. see FIG. 2).

Figure 5:
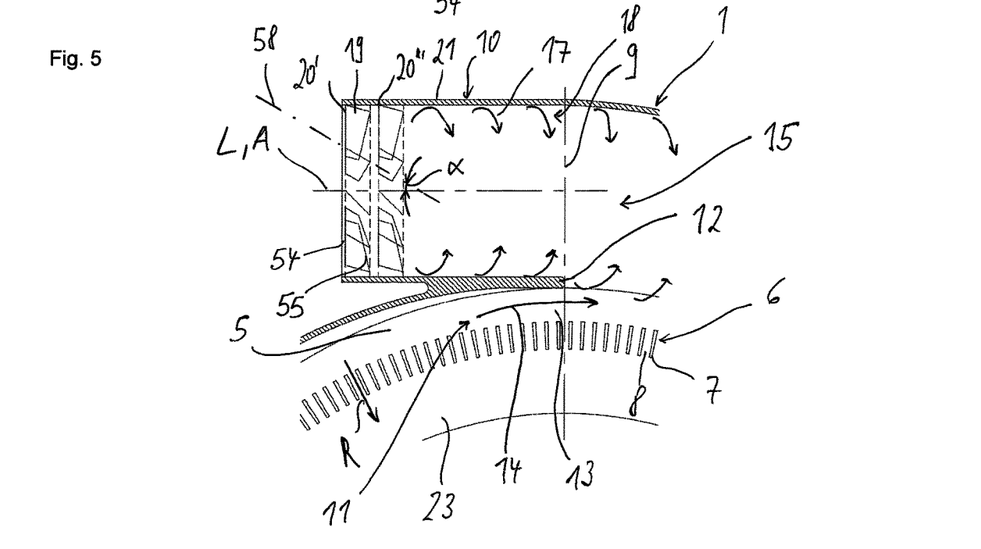
FIG. 5 is a partial view of a cooling device in sectional view, wherein a flow guiding device is inserted in a feed nozzle.

FIG. 5 shows a further example of a cooling gas ring 1. To illustrate the only difference compared to the above described cooling gas ring 1 as shown in FIGS. 1 to 3 an enlarged section of the feed connector 21 is shown. This design, thus, generally corresponds to the design shown in FIGS. 1 to 3, whose description is referred to in this respect and the same reference signs are used for the same details as in FIGS. 1 to 3.

The difference in the design of the flow guiding device 16, which, according to the example shown in FIG. 5, comprises two ring bodies 20', 20" arranged one behind the other in the direction of flow F. On said ring bodies 20', 20" guide elements 19', 19" are held, each arranged equally distributed in the circumferential direction around the longitudinal axis L. Accordingly, the flow guiding device 16 comprises two of the ring bodies 20 shown in FIG. 4 with the guide elements 19. The two ring bodies 20', 20" can be two bodies separated from each other, e.g. allowing the guiding elements 19', 19" to be adjusted relative to each other. The two ring bodies 20', 20" can also form a continuous ring body, so that the two ring body 20', 20" can also be sections of a common ring body.

Figure 6:
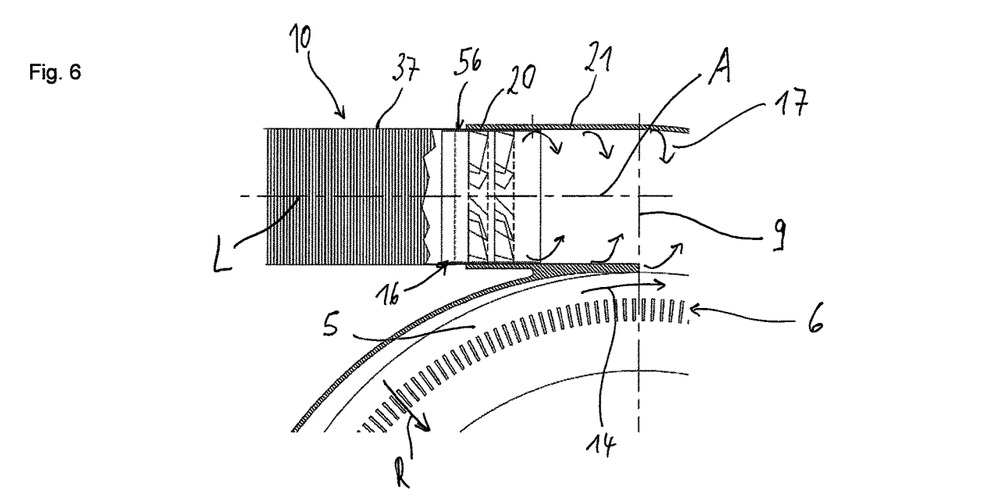
FIG. 6 is a partial view of a cooling device in sectional view, wherein a flow guiding device is arranged between a hose and a feed nozzle.
Figure 7:
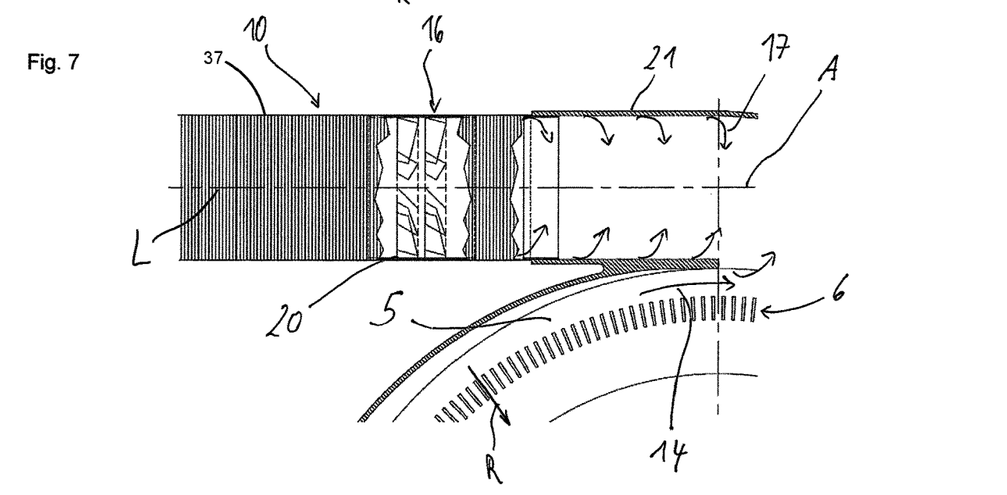
FIG. 7 shows a partial view of a cooling device in sectional view, wherein a flow guiding device is inserted in a hose.
Figure 8:
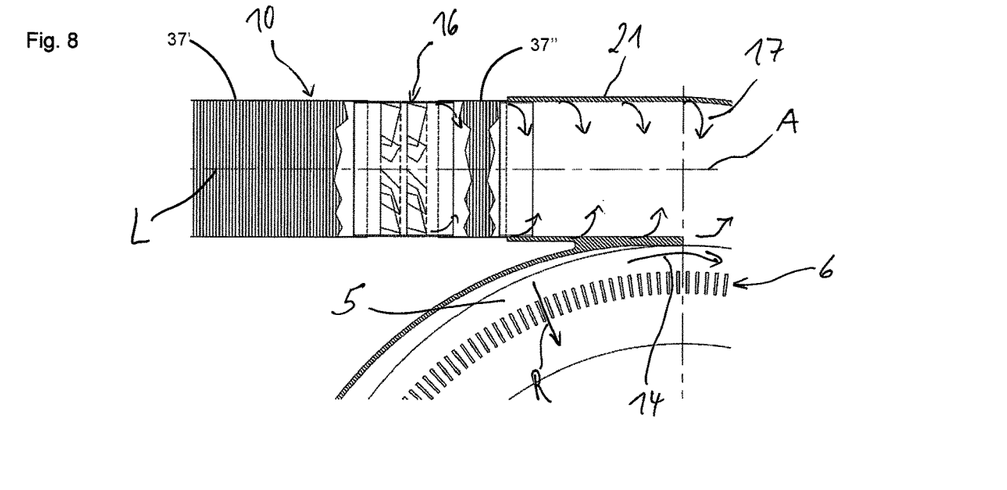
FIG. 8 is a partial view of a cooling device in sectional view, wherein a flow guiding device is arranged between two tubes.

FIGS. 6 to 8 show different arrangements of the flow guiding device 16. FIG. 6 shows by the way of example that the flow guiding device 16 can be inserted into the feed connector 21. The ring body 20 protrudes from the feed connector 21 and forms a contact surface 56 onto which a hose 37 of the feed channel 10 is attached, e.g., pushed and fastened, for example by means of a pipe clamp. FIG. 7 shows by way of example that the flow guiding device 16 can be pushed into the hose 37, and the hose 37 connected to the feed connector 21. FIG. 8 shows by way of example that the flow guiding device 16 can be arranged between two hoses 37', 37" of the feed channel 10. The arrangement possibilities for the flow guiding device 16 shown in FIGS. 1 to 3 and 5 to 8 can also be combined with each other. Also, it should be understood that the flow guiding device 16 shown in FIGS. 1 to 2 and 4 can also be arranged in the positions shown in FIGS. 6 to 8.

Figure 9:
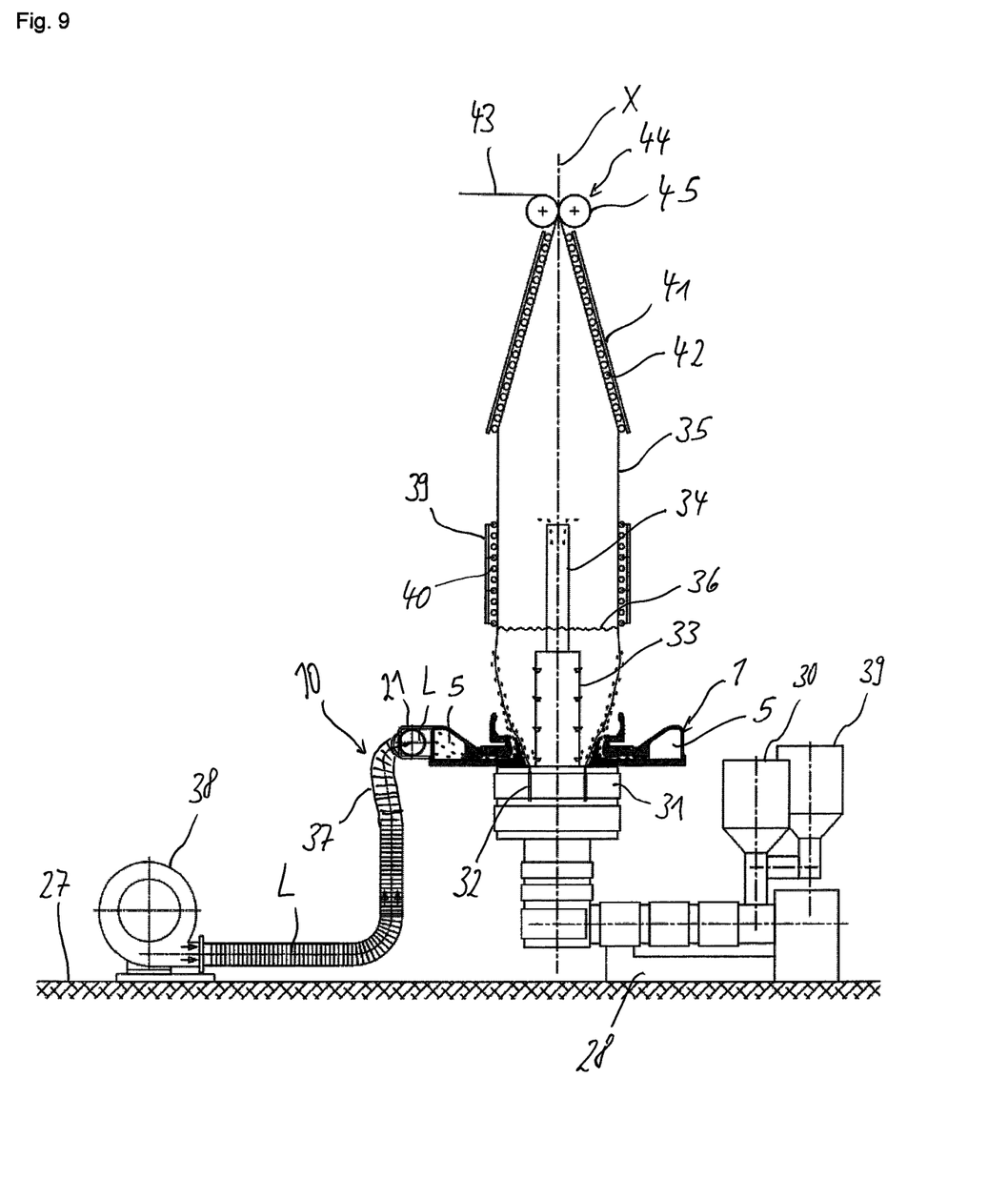
FIG. 9 is a film blowing installation with a cooling device in a vertical sectional view along the central axis.

FIG. 9 shows a film blowing apparatus with a cooling device in a vertical sectional view. The cooling device can be configured according to the arrangement shown in FIGS. 1 to 3 or according to the other ones described together with FIGS. 5 to 8.

An extruder 28 for thermoplastics stands on a base 27. Two feed hoppers 29, 30 can be seen that are arranged on the extruder 28. On the extruder 28 there is arranged a film blowing head 31 with the vertical central axis X, on which a ring extrusion nozzle 32, which is concentrically located to the central axis X, is shown. A gas guiding arrangement 33 and a gas suction pipe 34 are attached centrally to the film blowing head 31. This creates an internal overpressure in a film tube 35, which exits the extrusion nozzle 32 and initially expands as a result of the overpressure and, at a frost line 36, changes to a state in which further plastic deformation of the material is reduced or stops. The gas guiding arrangement 33 can contribute to the internal cooling of the tubular film material, whereas the cooling gas ring 1 serves for the external cooling.

The cooling gas ring 1 is connected to the hose 37, which is pushed onto the end of the feed connector 21. The other end of the hose 37 is connected to a blower 38, pressing cooling gas into the cooling gas ring 1.

Above the frost line 36 a mechanical calibration device 39 is displayed, in which the foil diameter is stabilized. The calibration device 39 can also be referred to as guiding device. The calibration device 39 comprises a plurality of rolls 40, which annularly rest on the film tube 35. Above the calibration device 39, a flattening device 41 is shown, which also comprises a plurality of rolls 42. However, in contrast to the calibration device 39, the flattening device 41 comprises a generally wedge-shaped design and forms from the round film tube 35 a double-layered flat film 43, which is connected at the edges. Above the flattening device 41, a take-off device 44 is displayed having two take-off rollers 45, which convey and compress the film tube. The film tube is continued as double-layer flat film 43, cut if necessary and wound up.

Figure 10:
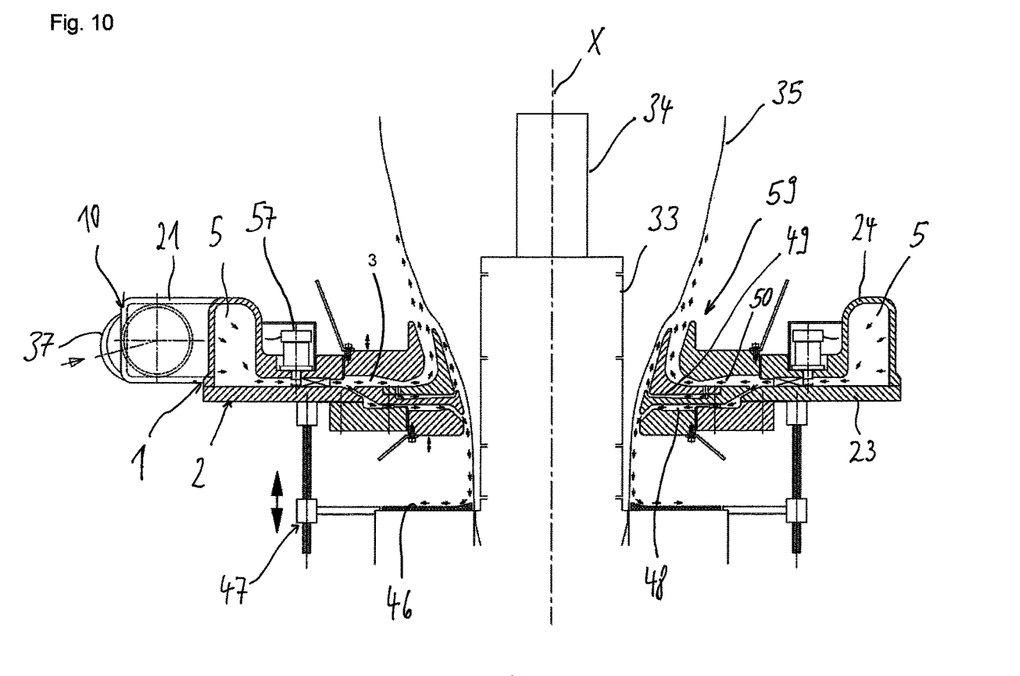
FIG. 10 is a partial view of an alternative film blowing machine with a cooling device.

FIG. 10 shows a modified film blowing apparatus with a cooling device in a vertical sectional view. The cooling device can be configured according to the first example shown in FIGS. 1 to 3 or according to the other examples explained with regard to FIGS. 5 to 8.

The film blowing apparatus shown in FIG. 10 generally differs from the film blowing apparatus shown in FIG. 9 in the design of the cooling gas ring, and only an enlarged section of the film blowing apparatus is shown to illustrate the difference. That is, the design shown in FIG. 10 generally corresponds to the design shown in FIG. 9 (except to the difference) and the same details are provided with the same reference signs as in FIG. 9.

An optional thermal insulation disc 46 is placed on the film blowing head 31. The cooling gas ring 1 is shown at a distance from the film blowing head 31 and is connected to the film blowing head 31 via a height-adjustable mounting 47. The ring nozzle 3 holds cooling lips 59, which are divided into a lower cooling lip section 48 and two cooling lip sections 49, 50 above. Above the lower cooling lip section 48 the cooling gas flows through an outlet opening directed in the opposite direction to the discharge direction of the tubular film, whereas above the two cooling lip section 49, 50 the cooling gas flows through outlet openings directed in the discharge direction of the tubular film. An adjusting device 57 for changing the flow cross-section of the flow channels 8 (FIGS. 2, 5) in sections is also shown.

Figure 11:
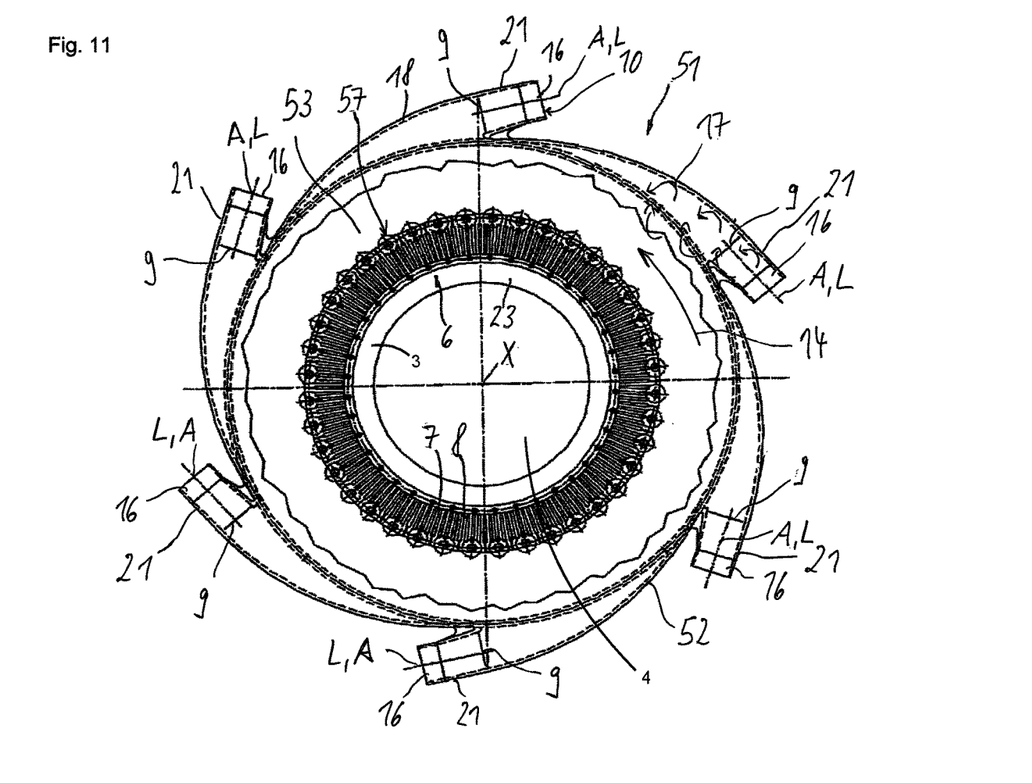
FIG. 11 is a cooling device in a partial sectional view.

FIG. 11 shows a cooling device according to a further example. In contrast to the examples of cooling devices shown in FIGS. 1 to 3 and FIGS. 6 to 8, a cooling gas ring 51 shown in FIG. 11 comprises several of the feed channels 10. The same details are provided with the same reference signs as in FIGS. 1 to 10.

The, by the way of example six, feed channels 10 individually attach from the outside at least approximately tangentially to a ring housing 52. The ring housing 52 also comprises a ring nozzle 3 arranged concentrically to the central axis X, which encloses the central recess 4 of the ring housing 52. The feed channels 10 comprise feed connectors 21 and open out via the feed openings 9 into the inner ring channel 53. In some aspects of the present disclosure, the feed channels 10 also have an initially cylindrical profile with a round cross-section, which passes continuously into a rectangular cross-section with rounded corners.

One of the flow guiding devices 16 is installed in each of the feed connectors 21 in order to rotate the cooling gas flowing through the respective feed channel 10 around the respective flow axis A before it enters the ring housing 52. In this way, the cooling gas flowing through the feed channels 10 is mixed with the residual flow 13 of cooling gas. Due to the common characteristics with regard to the mode of operation of the flow guiding device 16, reference is made to the above description of cooling gas rings 1 with only one feed channel 10.

Unless otherwise expressly indicated herein, all numerical values indicating mechanical/thermal properties, compositional percentages, dimensions and/or tolerances, or other characteristics are to be understood as modified by the word "generally", "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A cooling device for the external cooling of a film tube subjected to internal pressure in the production of blown films of thermoplastic material, comprising:
   a cooling gas ring comprising a ring housing with a ring nozzle arranged concentrically to a central axis and being open towards the film tube, and at least one inner ring channel extending in the circumferential direction about the central axis and being open radially inwards towards the ring nozzle,
   wherein at least one feed channel for supplying cooling gas is attached to the ring housing, wherein the at least one feed channel is connected to the ring channel,
   the cooling device further comprising at least one flow guiding device which is arranged in the at least one feed channel and is configured such that, when a cooling gas flows through the flow guiding device, at least a partial flow of the cooling gas is set in rotation about a flow axis prior to flowing into the ring channel so that the cooling gas flowing into the ring channel is mixed with a residual quantity of cooling gas already flowing within in the ring channel.

2. The cooling device according to claim 1, wherein the at least one flow guiding device is formed in a peripheral area of the at least one feed channel in order to generate the rotation of the cooling gas about the flow axis.

3. The cooling device according to claim 1, wherein the at least one flow guiding device is an independent unit.

4. The cooling device according to claim 1, wherein the at least one flow guiding device comprises at least one of fixed guide elements and adjustable guide elements.

5. The cooling device according to claim 4, wherein at least a subset of the guide elements is arranged in the circumferential direction about the flow axis.

6. The cooling device according to claim 4, wherein at least a subset of the guide elements is arranged one behind the other in flow direction.

7. The cooling device according to claim 4, wherein at least a subset of the guide elements is arranged in the circumferential direction about the flow axis and at least another subset is arranged one behind the other in flow direction.

8. The cooling device according to claim 4, wherein at least a subset of the guide elements is of plate-shaped or arcuately curved.

9. The cooling device according to claim 4, wherein at least a subset of the guide elements is arranged with a setting angle $\alpha$ of approximately 30° to 60° with respect to the flow axis.

10. The cooling device according to claim 4, wherein the at least one flow guiding device comprises at least one tubular base body on which at least a subset of the guiding elements is held.

11. The cooling device according to one of the claim 1, wherein the at least one flow guide device is arranged fixedly in the at least one feed channel.

12. The cooling device according to claim 1, wherein the cooling device comprises only one feed channel, and the ring housing comprises only one feed opening for the introduction of cooling gas into the ring channel and the feed channel is connected to the feed opening via a feed connector attached to the ring housing.

13. The cooling device according to claim 12, wherein the at least one flow guiding device is arranged in or on the at least one feed connector.

14. The cooling device according claim 1, wherein the ring housing comprises a plurality of feed openings for introducing cooling gas into the ring channel, each of the feed openings is connected to one of the feed channels via a feed connector, respectively, wherein the feed connectors are attached to the ring housing and the feed connectors all enter the ring channel in the same direction with regard to the circumferential direction about the central axis.

15. The cooling device according to claim 1, wherein the at least one feed channel comprises at least one hose, the at least one flow guiding device being arranged in the at least one hose.

16. The cooling device according to claim 1, wherein the at least one feed channel comprises at least one hose, the at least one flow guiding device being arranged between the at least one hose and the ring housing.

17. The cooling device according to claim 1, wherein the at least one feed channel comprises at least two hoses, the at least one flow guiding device being arranged between two adjacent hoses.

18. The cooling device according to claim 1 further comprising a flow straightener arrangement arranged between the ring channel and the ring nozzle, wherein the flow straightener arrangement is formed by a plurality of radially aligned and circumferentially distributed flow channels.

19. A cooling device for the external cooling of a film tube subjected to internal pressure in the production of blown films of thermoplastic material, comprising:
   a cooling gas ring comprising a ring housing with a ring nozzle arranged concentrically to a central axis and being open towards the film tube, and at least one inner ring channel extending in the circumferential direction about the central axis and being open radially inwards towards the ring nozzle, wherein at least one feed channel for supplying cooling gas is attached to and at least approximately tangentially on the outside of the ring housing, wherein the at least one feed channel is connected to the ring channel so that the cooling gas is set into a swirl flow around the central axis within the ring channel, the cooling device further comprising at least one flow guiding device which is arranged in the at least one feed channel and is configured such that, when a cooling gas flows through the flow guiding device, at least a partial flow of the cooling gas is set in rotation about a flow axis prior to flowing into the ring channel so that the cooling gas flowing into the ring channel is mixed with a residual quantity of cooling gas already flowing within in the ring channel.

20. A cooling device for the external cooling of a film tube subjected to internal pressure in the production of blown films of thermoplastic material, comprising:

a cooling gas ring comprising a ring housing with a ring nozzle arranged concentrically to a central axis and being open towards the film tube, and at least one inner ring channel extending in the circumferential direction about the central axis and being open radially inwards towards the ring nozzle, wherein at least one feed channel for supplying cooling gas is attached to and at least approximately tangentially on the outside of the ring housing, wherein the at least one feed channel is connected to the ring channel so that the cooling gas flowing into the ring channel through the at least one feed channel is set into a swirl flow around the central axis within the ring channel, a flow straightener arrangement being arranged between the ring channel and the ring nozzle to reduce the swirl flow of the cooling gas before passing the ring nozzle, the cooling device further comprising at least one flow guiding device which is arranged in the at least one feed channel and is configured such that, when a cooling gas flows through the flow guiding device at least a partial flow of the cooling gas is set in rotation about a flow axis prior to flowing into the ring channel so that the cooling gas flowing into the ring channel is mixed with a residual quantity of cooling gas already flowing within in the ring channel.

* * * * *